Nov. 4, 1930. J. A. RECKO 1,780,402
PIPE FITTING
Filed July 30, 1928
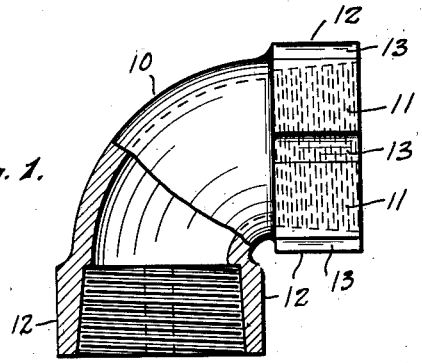
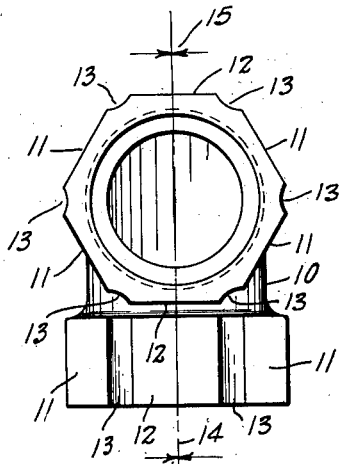
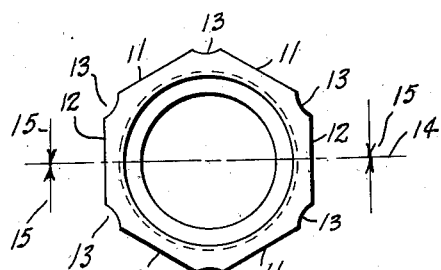
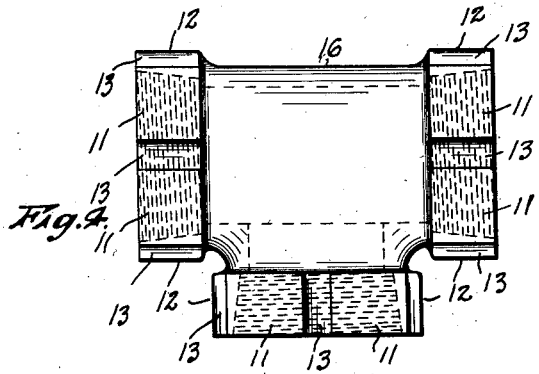
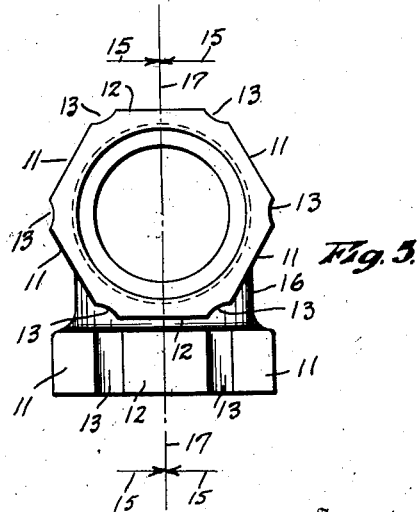
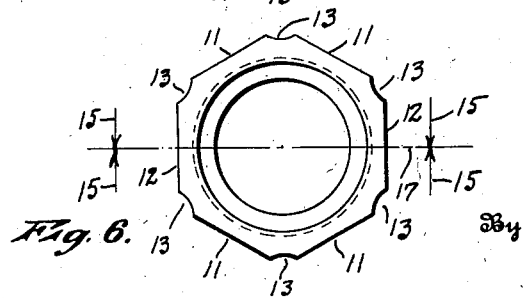
Inventor
Joseph A. Recko
By Wooster & Davis
Attorneys.

Patented Nov. 4, 1930

1,780,402

UNITED STATES PATENT OFFICE

JOSEPH A. RECKO, OF BRIDGEPORT, CONNECTICUT

PIPE FITTING

Application filed July 30, 1928. Serial No. 296,245.

This invention relates to a pipe fitting, such as an elbow, T, union and the like, and has for an object to provide a fitting with improved means to cooperate with the wrenches used in connecting the fitting with sections of pipe, and particularly to provide an improved flange construction which is equally adapted for use with the ordinary wrench having straight flat jaws or with any standard type of pipe wrench, such as a Stillson or chain wrench.

With the foregoing and other objects in view, the invention consists in certain novel features of construction, as will be more fully described in connection with the accompanying drawing. In this drawing, Fig. 1 is a partial side elevation and partial section of a pipe elbow showing my improved construction.

Fig. 2 is an end elevation looking from the right of Fig. 1.

Fig. 3 is an end elevation of the lower branch of this elbow.

Fig. 4 is a side elevation of a T fitting showing my improved construction.

Fig. 5 is an end elevation thereof looking from the right of Fig. 4, and

Fig. 6 is an end elevation of a side branch of this T.

In the ordinary pipe fittings the common construction is to provide flanges having a plurality of flat surfaces for the ordinary flat straight jaw wrenches, the flats being arranged in square, hexagonal or octagonal relation as is found most desirable, or round flanges may be used which must be operated with so-called pipe wrenches, such as those of the Stillson or chain type. The square, hexagonal or octagonal flanges may be used with the pipe wrenches but these wrenches are liable to objectionably mar or injure the surfaces of the flange, particularly by breaking off the corners between the flats, and, of course, the round flanges cannot be used with the flat jaw wrenches, and when used with the ordinary pipe wrenches they are marred objectionably in securing a proper grip by the jaws of these wrenches.

I have devised a construction which may be used with equal facility with either type of wrench, and which will give sufficient grip with either type without objectionably marring the fitting. Referring to the accompanying drawing, I have shown in Figs. 1 and 2 this improved construction as applied to a pipe elbow 10. The flanges at the ends of the two branches comprise a series of flats 11 and 12. In the present construction they are shown as having six of these flats arranged in pairs in parallel relation on opposite sides of the flange, and at the junction between two adjacent flats the flange is provided with transverse grooves 13 in place of the usual corner. The flats 11 and 12 are adapted for use with an ordinary straight jaw wrench while the grooves 13 provide a sufficient grip for the so-called pipe wrenches either of the Stillson or chain type, and it is not, therefore, necessary to mar the surface of the flange in using this type of wrench. The grooves increase the number of corners which are at a more obtuse angle than in the old type and are, therefore, much less easily broken.

If this arrangement is used with a cast metal fitting the flat surfaces 12 in both flanges are arranged substantially normal or at right angles to the plane 14 in which the axes of two branches lie. Therefore, the two sections of the pattern are drawn at substantially right angles to this plane, as indicated by the arrows 15, Figs. 2 and 3. In other words the pairs of flats 12 are substantially parallel to the directions in which the two sections of the pattern are drawn from the mold, and the grooves 13 and the remaining flats 11 being inside of these surfaces do not interfere with the proper drawing of the pattern from the sand of the mold.

In Figs. 4, 5 and 6, I have shown this improved construction as applied to a T fitting 16. In this form as in the first form the flat surfaces 12 are substantially parallel to the direction in which the two sections of the pattern are drawn from the mold, or in other words they are substantially normal to the plane 17 in which the axes of the various branches lie and the sections of the pattern are drawn in the same manner as in the case of the elbow.

It will, of course, be obvious that this construction of flange is not limited to use with an elbow or T fitting but is equally adapted for use on unions, valve bodies and the like.

Having thus set forth the nature of my invention, what I claim is:

As an article of manufacture, a pipe fitting having a flange provided with a series of flats and concave grooves, said grooves extending transversely of the flange and arranged at the junctions of adjacent flats in alternate relation throughout its periphery, and the curvature of the grooves being such that the angle of the edges between the flats and grooves is greater than the angle between adjacent flats.

In testimony whereof I affix my signature.

JOSEPH A. RECKO.